United States Patent
Clothier et al.

(10) Patent No.: US 9,410,442 B2
(45) Date of Patent: Aug. 9, 2016

(54) TURBOMACHINE

(75) Inventors: Andrew Charlton Clothier, Malmesbury (GB); Matthew John Childe, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 453 days.

(21) Appl. No.: 13/594,458

(22) Filed: Aug. 24, 2012

(65) Prior Publication Data

US 2013/0051983 A1 Feb. 28, 2013

(30) Foreign Application Priority Data

Aug. 26, 2011 (GB) .................................. 1114789.9

(51) Int. Cl.
| | |
|---|---|
| *F04D 29/057* | (2006.01) |
| *F04D 29/42* | (2006.01) |
| *F04D 25/06* | (2006.01) |
| *F01D 15/10* | (2006.01) |
| *H02K 17/08* | (2006.01) |
| *H02K 7/14* | (2006.01) |

(52) U.S. Cl.
CPC .............. *F01D 15/10* (2013.01); *F04D 25/0606* (2013.01); *F04D 25/068* (2013.01); *F04D 29/057* (2013.01); *F04D 29/4213* (2013.01); *H02K 11/33* (2016.01); *H02K 17/08* (2013.01); *H02K 7/14* (2013.01)

(58) Field of Classification Search
CPC ........ F01D 15/10; H02K 17/08; H02K 11/00; F04D 29/057

USPC ........... 417/371, 423.7, 423.1, 423.4; 415/71, 415/203; 310/68 D, 72, 68 R, 62–63
See application file for complete search history.

(56) References Cited

U.S. PATENT DOCUMENTS

| | | | |
|---|---|---|---|
| 3,011,083 A | | 11/1961 | Jacob |
| 3,237,137 A | * | 2/1966 | Flaminio ........................ 336/209 |
| 3,243,621 A | * | 3/1966 | Wesolowski ................... 310/168 |
| 3,465,273 A | * | 9/1969 | Brock .............................. 336/62 |
| 3,912,958 A | * | 10/1975 | Steen ............................ 310/168 |
| 4,400,140 A | | 8/1983 | Papst |
| 5,316,440 A | | 5/1994 | Kijima et al. |
| 5,517,067 A | * | 5/1996 | Sata ............................ 310/68 B |
| 5,548,169 A | | 8/1996 | Iwasa et al. |
| 5,618,168 A | | 4/1997 | Moon |

(Continued)

FOREIGN PATENT DOCUMENTS

| | | |
|---|---|---|
| DE | 3137981 | 4/1983 |
| DE | 4038775 | 6/1992 |

(Continued)

OTHER PUBLICATIONS

Search Report dated Nov. 21, 2013, directed to GB Application No. 1318812.3; 1 page.

(Continued)

*Primary Examiner* — Devon Kramer
*Assistant Examiner* — Lilya Pekarskaya
(74) *Attorney, Agent, or Firm* — Morrison & Foerseter LLP

(57) ABSTRACT

A turbomachine having a rotor assembly, a stator assembly and a toroidal inductor. The rotor assembly includes an impeller. The inductor is located between the impeller and the stator assembly, and is exposed to an airflow generated by or acting upon the impeller.

5 Claims, 2 Drawing Sheets

(56) References Cited

U.S. PATENT DOCUMENTS

| | | | |
|---|---|---|---|
| 6,413,039 B1 | 7/2002 | Morris et al. | |
| 6,439,845 B1 | 8/2002 | Veres | |
| 6,447,631 B1 | 9/2002 | Schaehl et al. | |
| 7,142,085 B2 * | 11/2006 | Phadke | 336/229 |
| 8,087,453 B2 * | 1/2012 | Xiang | 165/104.33 |
| 8,148,860 B2 * | 4/2012 | Wong et al. | 310/68 R |
| 8,749,105 B2 * | 6/2014 | Arita et al. | 310/181 |
| 2005/0158172 A1 | 7/2005 | Snyder et al. | |
| 2009/0168347 A1 | 7/2009 | Xiang | |
| 2011/0135520 A1 * | 6/2011 | Pal | 417/423.8 |
| 2011/0169383 A1 * | 7/2011 | De Filippis | 310/68 R |

FOREIGN PATENT DOCUMENTS

| | | |
|---|---|---|
| FR | 2827345 | 1/2003 |
| GB | 1 377 889 | 12/1974 |
| GB | 1 423 018 | 1/1976 |
| GB | 2467964 | 8/2010 |
| GB | 2467967 | 8/2010 |
| GB | 2467969 | 8/2010 |
| JP | 2011-202594 | 10/2011 |
| WO | WO-2005/054694 | 6/2005 |
| WO | WO-2011/033800 | 3/2011 |

OTHER PUBLICATIONS

Search Report dated Dec. 19, 2011, directed to counterpart GB Application No. 1114789.9; 1 page.

International Search Report and Written Opinion mailed Nov. 12, 2012, directed to International Application No. PCT/GB2012/052051; 9 pages.

* cited by examiner

TURBOMACHINE

REFERENCE TO RELATED APPLICATIONS

This application claims the priority of United Kingdom Application No. 1114789.9, filed Aug. 26, 2011, the entire contents of which are incorporated herein by reference.

FIELD OF THE INVENTION

The present invention relates to a turbomachine.

BACKGROUND OF THE INVENTION

The circuit assembly of a turbomachine may include an inductor for smoothing current ripple. The physical size of the inductor is often relatively large and thus impacts on the overall size of the turbomachine.

SUMMARY OF THE INVENTION

In a first aspect, the present invention provides a turbomachine comprising a rotor assembly, a stator assembly, and a toroidal inductor, wherein the rotor assembly comprises an impeller, and the inductor surrounds the rotor assembly, is located between the impeller and the stator assembly, and is exposed to an airflow generated by or acting upon the impeller.

By employing a toroidal inductor that surrounds the rotor assembly and is located between the stator assembly and the impeller, a relatively compact turbomachine may be achieved. Additionally, since the inductor is exposed to the airflow generated by or acting upon the impeller, copper loses may be reduced.

The rotor assembly may comprise a shaft to which a rotor core, a bearing assembly and the impeller are mounted. The bearing assembly is then located between the rotor core and the impeller, and the inductor surrounds the bearing assembly. By mounting the impeller and the rotor core on opposite sides of the bearing assembly, a relatively compact rotor assembly is achieved. By employing a toroidal inductor that surrounds the bearing assembly, good use is made of the available space around the bearing assembly.

The turbomachine may comprise a circuit board to which the inductor is electrically coupled, and the stator assembly may be located between the circuit board and the inductor. By locating the circuit board in this way, the circuit board may be isolated from the airflow, if required. Alternatively, the circuit board may be exposed to the airflow but, owing to its location, does not adversely interfere or restrict the airflow.

The turbomachine may comprise a shroud that covers the impeller, and the inductor may surround the shroud. By surrounding the shroud, the inductor makes good use of the available space around the shroud. The inner diameter of the inductor may be smaller than the outer diameter of the impeller. As a result, the inductor surrounds the shroud whilst remaining radially compact In a second aspect, the present invention provides a turbomachine comprising an impeller, a shroud covering the impeller, and a toroidal inductor that surrounds the shroud.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
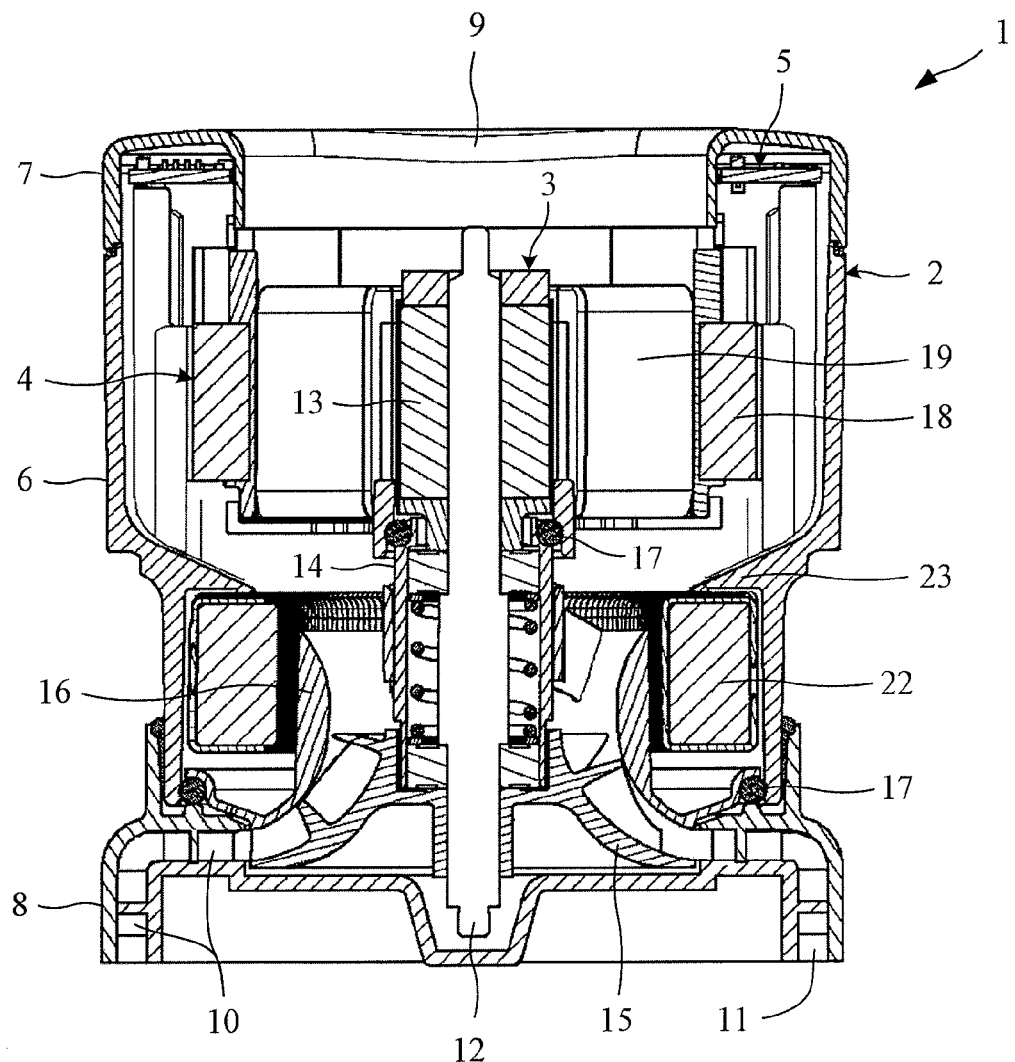
FIG. 1 is a sectional view of a turbomachine in accordance with the present invention.
Figure 2:
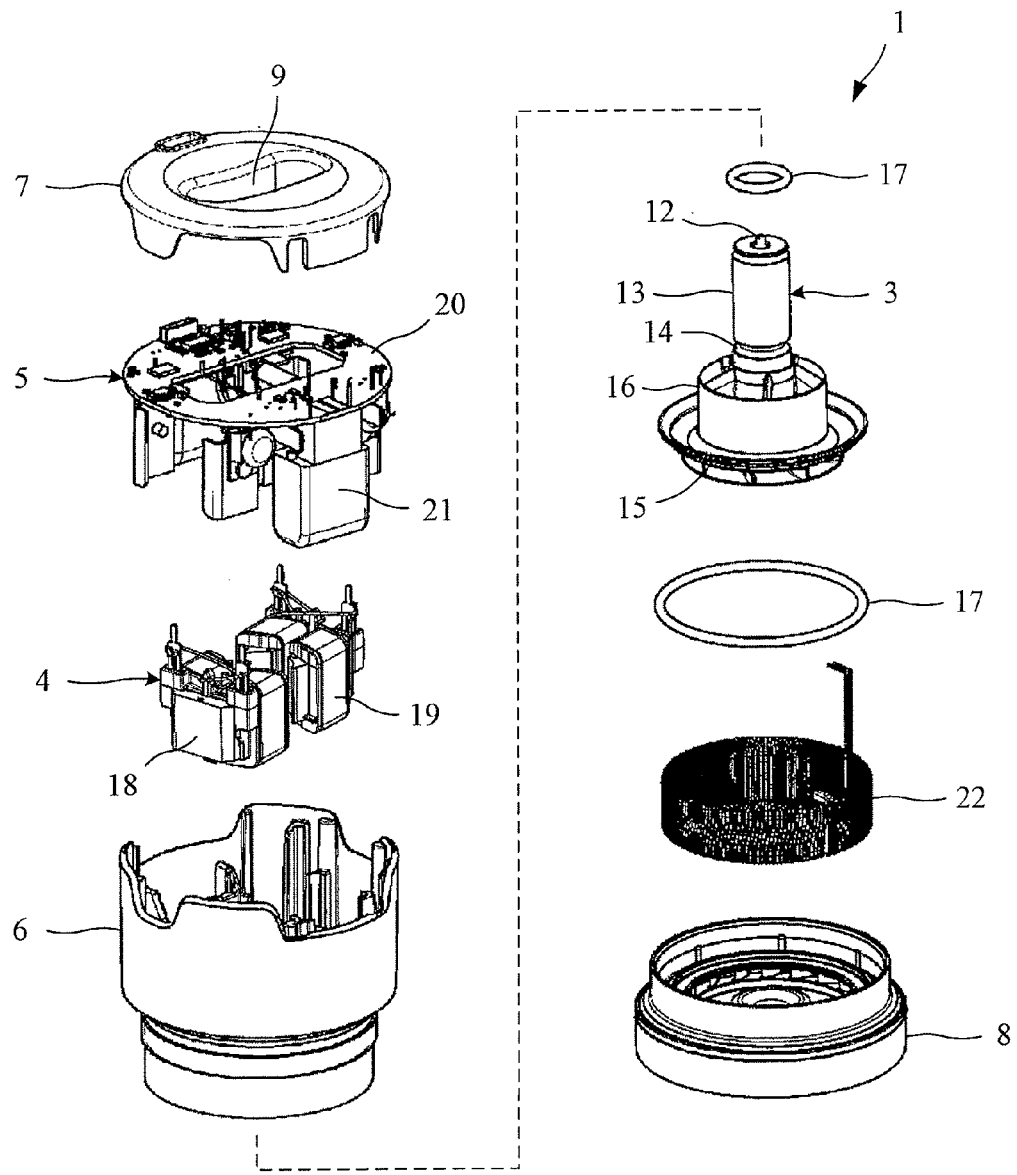
FIG. 2 is an exploded view of the turbomachine.

The turbomachine 1 of FIGS. 1 and 2 comprises a housing 2, a rotor assembly 3, a stator assembly 4, and a circuit assembly 5.

The housing 2 comprises a main body 6, an upper cover 7, and a lower cover 8. The main body 6 comprises an internal frame that supports the rotor assembly 3, the stator assembly 4, and the circuit assembly 5. The upper cover 7 is secured to a first end of the main body 6 and comprises an inlet 9 through which a working airflow is admitted. The lower cover 8 is secured to a second end of the main body 6 and comprises diffuser vanes 10 and an outlet 11 through which the working fluid is discharged.

The rotor assembly 3 comprises a shaft 12, a rotor core 13, a bearing assembly 14, an impeller 15 and a shroud 16. The rotor core 13, the bearing assembly 14 and the impeller 15 are each mounted to the shaft 12. The shroud 16 is mounted to the bearing assembly 14 so as to cover the impeller 15. The rotor assembly 3 is mounted to the main body 6 of the housing 2 at the bearing assembly 14 and at the shroud 16. More particularly, the rotor assembly 3 is soft mounted at each location by an o-ring 17.

The stator assembly 4 comprises a pair of stator cores 18 arranged on opposite sides of the rotor core 13. Conductive wires 19 are wound about the stator cores 18 and are coupled together to form a phase winding. The phase winding is then electrically coupled to the circuit assembly 5.

The circuit assembly 5 comprises a circuit board 20 and a plurality of electrical components 21. The circuit board 20 is located on a side of the stator assembly 4 distal to the impeller 15, i.e. the stator assembly 4 is located between the circuit board 20 and the impeller 15. The circuit board 20 lies in a plane that is perpendicular to the rotational axis of the rotor assembly 3; this then provides an axially compact arrangement. Among the electrical components 21 is a toroidal inductor 22. The inductor 22 surrounds the rotor assembly 3 and is located between the stator assembly 4 and the impeller 15. The winding of the inductor 22 then extends axially past the stator assembly 4 and is electrically coupled to the circuit board 20.

During operating of the turbomachine 1, the impeller 15 draws air through the interior of the housing 2 from the inlet 9 to the outlet 11. The airflow generated by the impeller 15 passes over and cools the stator assembly 4. The interior of the housing 2 is shaped so that the airflow, after passing over the stator assembly 4, is guided towards the inlet of the shroud 16. To this end, the main body 6 of the housing 2 comprises a radial flange 23 that extends inwardly from an outer wall. The inductor 22 is located below this flange 23 and thus relatively little of the airflow passes over the inductor 22. Nevertheless, the inductor 22 is exposed to the airflow (i.e. the inductor 22 is not isolated from the airflow) and is therefore cooled to some degree by the airflow. If increased cooling of the inductor 22 is required, the location of the inductor 22 and/or the interior of the housing 2 may be shaped so that the inductor 22 is exposed to more of the airflow. For example, the radial flange 23 may be shortened or removed altogether. Since both the stator assembly 4 and the inductor 22 are exposed to the airflow, copper losses are reduced and thus a more efficient turbomachine 1 is achieved.

By employing a toroidal inductor 22 that surrounds the rotor assembly 3 and is located between the stator assembly 4 and the impeller 15, a relatively compact turbomachine 1 is achieved. In contrast, the circuit assembly of a conventional turbomachine might include an inductor (e.g. an E-core inductor) mounted directly on the circuit board. Owing to the physical size of the inductor, the overall size of the turbomachine is increased. Indeed, owing to the size of the inductor, it may be necessary to locate the circuit assembly remotely from the remainder of the turbomachine. The turbomachine 1 of the present invention, on the other hand, makes use of the space between the stator assembly 4 and the impeller 15 to locate a toroidal inductor 22. As a result, a more compact turbomachine 1 is achieved. Additionally, the circuit assembly 5 may be mounted within the housing 2 of the turbomachine 1. This then simplifies the mounting of the turbomachine 1 within a product. In particular, it is not necessary to mount the turbomachine and the circuit assembly separately within the product and then establish electrical connections between the two.

The bearing assembly 14 is located between the rotor core 13 and the impeller 15. As a result, the rotor assembly 3 is relatively compact in the axial direction. A further advantage of this arrangement is that the rotor assembly 3 can be dynamically balanced as a complete unit prior to mounting within the housing 2. The inductor 22 occupies the space around the bearing assembly 14. Since the stator assembly 4 and the impeller 15 are radially larger than the bearing assembly 14, the introduction of the inductor 22 does not increase the overall size (i.e. the axial length or maximum outer diameter) of the turbomachine 1.

The inductor 22 surrounds not only the bearing assembly 14 but also the shroud 16. The outer diameter of the impeller 15 increases from the inlet to the outlet of the impeller 15. The outer diameter of the shroud 16 likewise increases from the inlet to the outlet. By surrounding the shroud 16, the inductor 22 makes good use of the available space around the shroud 16. Moreover, the inner diameter of the inductor 22 is smaller than the outer diameter of the impeller 15. As a result, the inductor 22 surrounds the shroud 16 whilst remaining radially compact.

The circuit board 20 is located on a side of the stator assembly 4 distal to the impeller 15 and the inductor 22, i.e. the stator assembly 4 is located between the circuit board 20 and the impeller 15/inductor 22). By locating the circuit board 20 in this way, the circuit board 20 does not adversely interfere with the airflow passing through the housing 2. Although the circuit board 20 does not adversely interfere with the airflow, the circuit assembly 5 is nevertheless exposed to the airflow and thus electrical components 21 mounted on the circuit board 20 may be cooled. If required, the circuit board 20 may be isolated from the airflow. This may be necessary, for example, if the airflow is likely to carry liquid that might short or otherwise damage electrical components 21 on the circuit board 20. Owing to the location of the circuit board 20, the circuit board 20 may be isolated whilst the stator assembly 4 and the inductor 22 continue to be exposed to the airflow.

In the embodiment described above, the impeller 15 generates an airflow and thus the turbomachine 1 acts as a compressor. Alternatively, an airflow may act upon the impeller 15 such that the turbomachine 1 acts as a turbine.

The invention claimed is:

1. A turbomachine comprising:
a rotor assembly, a stator assembly, and a toroidal inductor, wherein the rotor assembly comprises an impeller, the inductor surrounds the rotor assembly, and the inductor is located between the impeller and the stator assembly, and is directly exposed to an airflow generated by or acting upon the impeller.

2. The turbomachine of claim 1, wherein the rotor assembly comprises a shaft to which a rotor core, a bearing assembly and the impeller are mounted, the bearing assembly being located between the rotor core and the impeller, and the inductor surrounds the bearing assembly.

3. The turbomachine of claim 1, wherein the turbomachine comprises a circuit board, the inductor is electrically coupled to the circuit board, and the stator assembly is located between the circuit board and the inductor.

4. The turbomachine of claim 1, wherein the turbomachine comprises a shroud that covers the impeller, and the inductor surrounds the shroud.

5. The turbomachine of claim 4, wherein the inner diameter of the inductor is smaller than the outer diameter of the impeller.

* * * * *